United States Patent [19]
De Le Mare et al.

[11] 3,959,222
[45] May 25, 1976

[54] STABILIZED ACRYLATE RESINS

[75] Inventors: Harold E. De Le Mare, Houston, Tex.; Harry Frank, Cherry Hill, N.J.

[73] Assignee: Shell Oil Company, Houston, Tex.

[22] Filed: Jan. 28, 1975

[21] Appl. No.: 544,729

[52] U.S. Cl. .................... 260/47 EP; 204/158.23; 260/2 BP; 260/59 EP
[51] Int. Cl.² ........................................ C08G 30/04
[58] Field of Search ............ 260/47 EP, 837 R, 836, 260/45.7 P, 45.7 S, 2 EP, 18 EP, 59

[56] References Cited
UNITED STATES PATENTS

| | | | |
|---|---|---|---|
| 2,824,851 | 2/1958 | Hall | 260/837 R |
| 3,377,406 | 4/1968 | Newey et al. | 260/837 R |
| 3,600,290 | 8/1971 | Fitko | 260/837 R |
| 3,773,856 | 11/1973 | Takiyama et al. | 260/836 |

*Primary Examiner*—Murray Tillman
*Assistant Examiner*—T. Pertilla

[57] ABSTRACT

Improved stabilized acrylate resins compositions comprise the acrylate resin and a precise amount of a stabilizing acid having a $pK_a$ less than 2.5 and having an anion having a nucleophilicity of less than 2.5. An improved method of preparing stabilized acrylate resins comprises reacting the acrylate acid, epoxide, nucleophilic catalyst and stabilizing acid simultaneously to give the stabilized acrylate resin.

15 Claims, No Drawings

STABILIZED ACRYLATE RESINS

BACKGROUND OF THE INVENTION

Liquid epoxy-derived acrylate resins are generally prepared by the reaction of an acrylic type acid and a polyepoxide. The practical synthesis of these acrylate resins requires the use of a nucleophilic catalyst such as tetramethylammonium chloride (TMAC), triphenylphosphine, tetramethylammonium bromide (TMAB), tetramethylammonium iodide (TMAI), triphenylethylphosphonium iodide or triethanolamine. For example when triphenylphosphine is used, the reaction may be depicted as follows:

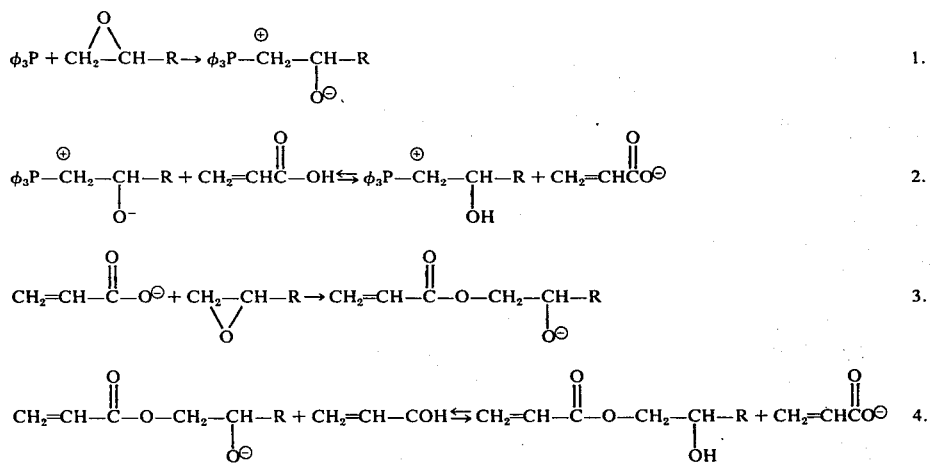

The liquid acrylate type resins are very attractive to end users because of their inherent low viscosity and high reactivity. But this inherent high reactivity is a source of problems in that it is difficult for the manufacturer to repeatedly produce resins having the same initial viscosity. Any slight variation in process conditions can cause a variation in the resin's initial viscosity. Furthermore, this high reactivity presents a problem if the resins must be stored for long periods of time or shipped during hot weather. The end user wants a liquid resin with a repeatable low viscosity and high reactivity yet good storage stability.

A known source of instability in the acrylate type resins is the tendency to undergo free radical polymerization. This, of course, is the very mechanism used by the end user to cure the resins. It is known to add free radical inhibitors to acrylate resins and in fact, free radical inhibitors do enhance the stability of the acrylate type resins of this invention. However, an 85% acrylate resin (where the % acrylate resin means the approximate % of epoxide groups reacted with acrylic type acid) made using a nucleophilic catalyst without "added" free radical inhibitor will double its viscosity in 2 days at 60°C but the same acrylate resin with additional free radical inhibitor will also double its viscosity in 2 days at 60°C. By "added" free radical inhibitor is meant that inhibitor over and above that normally used in acrylate resins. Almost all acrylates including the acrylic type acids used to make the ester composition of this invention have hydroquinone in them to retard premature polymerization. As can be seen, even with the free radical inhibitor the acrylate resins made with a nucleophilic catalyst exhibit a high degree of instability. The end user wants to use a low viscosity resin with little variation from lot-to-lot in its viscosity, a resin which can be stored under a variety of conditions for different lengths of time, and a resin which has high reactivity. It has now been found that the lot-to-lot viscosity variability and the stability of the acrylate resins can be dramatically enhanced, thereby solving the problems faced by the manufacturer and end user, by the addition of selected amounts of certain acids.

SUMMARY OF THE INVENTION

This invention is an improved stabilized acrylate resin composition containing at least 0.01 equivalent/100 g of residual epoxide formed by the use of a nucleophilic catalysts in the reaction of an acrylic or methacryllic acid with a liquid polyepoxide made from Bisphenol-A or -F and epichlorohydrin, the resin having a substantial resistance to viscosity increase during storage. The composition comprises the acrylate resin, a molar amount of an acid at least equal to the molar amount of said catalyst used to form said acrylate resin, the acid having a $pK_a$ below 2.5 and an anion with a nucleophilicity at 50°C in aqueous acetone of less than 2.5, and optionally small additional amounts of free radical scavengers. The invention also includes a method of preparing an acrylate resin composition having low lot-to-lot viscosity variation and improved resistance to viscosity increases during storage and shipping which comprises blending (A) a liquid polyepoxide, (B) acrylic acid, methacrylic acid or mixtures thereof in a molar amount equal to or less than the equivalents of epoxide of A, (C) from about 1 to about 5 mole percent based on moles of acrylic and methacrylic acids added, of a nucleophilic catalyst selected from the group consisting of tetramethylammonium chloride, tetramethylammonium bromide, triphenylphosphine, ethyltriphenylphosphonium iodide (chloride or bromide), and (D) a molar amount of an acid equivalent to the moles of catalyst added in C, said acid having a $pK_a$ of less than 2.5 and a nucleophilicity at 50°C in aqueous acetone of less than 2.5, and heating the resulting blend with stirring to a temperature of from about 240° to about 280°F for a period from about 1 hour to about 3 hours and then cooling to room temperature.

DESCRIPTION OF THE PREFERRED EMBODIMENTS

The stabilized resin composition comprises a particular type of acrylate resin and a specified amount of an acid with a particular acidity, said acid having an anion with a particular nucleophilicity.

The Acrylate Resin

The acrylate resins of this invention are those formed from the reaction of a liquid epoxide with an acrylic type acid in the presence of a nucleophilic catalyst. These acrylate resins comprise those where greater than about 50%, preferably greater than 70%, and most preferably greater than 90% of the epoxide groups have been reacted with an acrylic type acid but the acrylate resins must have greater than about 0.01, preferably greater than about 0.015 and most preferably greater than about 0.02 equivalent of epoxide function per 100 grams resin (eq/100).

The liquid epoxide may be of any type. The epoxide functions may be those formed by oxidation of an olefin or by the reaction of a base with a 1,2-chlorohydrin. Preferably the epoxide is one formed with epichlorohydrin and compounds containing hydroxy functions. These hydroxy functions can be alcohols, phenols or acids. The hydroxy containing compound can be one having alphatic, cycloaliphatic or aromatic groups or mixtures thereof. The preferred hydroxy containing compound are those made from the condensation of a phenol and a carbonyl containing compound. Of the condensation products the preferred compounds are the diphenylolpropanes Bisphenol F, diphenylolethanes or diphenylolmethanes and mixtures thereof. Of these compounds Bisphenol-A, Bisphenol-F and mixtures thereof are the preferred.

The preferred epoxide compounds are the liquid polyepoxide formed by the reaction of bisphenols and epichlorohydrin and the most preferred epoxides are the products formed from about 2 moles of epichlorohydrins and about 1 mole of bisphenol where the epoxy equivalent is greater than 1. The preferred epoxide is the 1-Bisphenol-A/approximately 2-epichlorohydrin product known commercially as EPON 828 Resin.

The epoxides are reacted with acrylic type acids, preferably acrylic acid, methacrylic acid or mixtures thereof, most preferably acrylic acid.

The reaction of the acrylic type acid and the epoxide are carried out in the presence of a nucleophilic catalyst. The preferred nucleophilic catalysts are tetramethylammonium chloride or bromide (TMAC or TMAB), triphenylphosphine, ethyltriphenylphosphonium iodide or bromide, dimethylbenzyl amine etc. The most preferred nucleophilic catalysts are triphenylphosphine and TMAC. These nucleophilic catalysts are used in a concentration of about 0.1 to about 5 mole percent, preferably about 0.5 to about 3 mole percent and most preferably from about 0.5 to about 1.0 mole percent based on the moles of epoxy functional groups.

The Stabilizing Acid

The acid used to stabilize the acrylate resins made by the use of nucleophilic catalysts must have a certain acidity (acid strength), the anion of the acid must have a certain nucleophilicity and the concentration of the acid must be within a certain range. The strength of an acid HA may be expressed as the negative log to the base 10 of the equilibrium constant K in water at 25°C. Therefore in the disassociation of the acid HA where the brackets [ ] signify molar concentration, the equilibrium constant K of an acid is defined as follows:

$$K = \frac{[H^{\oplus}][A^{\ominus}]}{[HA]}$$

The stronger the acid the lower the $pK_a$.

The $pK_a$ of the stabilizing acid used in this invention must be below about 2.5, preferably about 0.7 to about 2 and most preferably about 0.7 to about 1.0.

The anion $A^{\ominus}$ of the stabilizing acid of this invention must have a certain nucleophilicity. Nucleophilicity according to Swain and Scott (J. Amer. Chem. Soc., 75, 141 (1953)) is a measure of the tendency of an anion to enter into a polar substitution reaction. The quantitative measure of the nucleophilicity ($n$) is expressed as:

$$n = \frac{\log\left(\frac{k}{k_{H_2O}}\right)}{S}$$

where $k$ equals the rate constant of a given nucleophilic agent and $K_{H_2O}$ equals the rate constant of water acting as a nucleophilic agent and S equals the sensitivity of the substrate to changes in nucleophilicity.

The anion $A^{\ominus}$ of the stabilizing acid of this invention must have an n less than about 2.5 preferably less than about 2 and most preferably less than about 1.

Examples of acids which meet these requirements are para-toluenesulfonic acid (PTSA), p-phenolsulfonic acid, 2-hydroxy-4-methoxybenzophenone-5-sulfonic acid, phosphoric acid and sulfuric acid, the preferred acids are PTSA, p-phenolsulfonic acid and phosphoric acid. The most preferred acid is PTSA.

The concentration of the stabilizing acid to be used in the invention depends in part on the type of epoxide used to make the acrylate resin. In the case where the epoxides used to make the acrylate have the following structures;

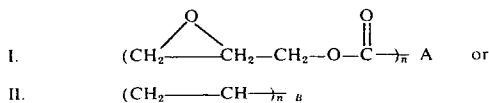

I. $(CH_2\underset{\diagdown O \diagup}{\overline{\qquad}}CH_2-CH_2-O-\overset{O}{\underset{\|}{C}}\!\!\rightarrow_{\overline{n}} A$    or II. $(CH_2\underset{\diagdown O \diagup}{\overline{\qquad}}CH\!\!\rightarrow_{\overline{n}} B$ where A is an aliphatic, cycloaliphatic or aromatic group, B is an aliphatic or cycloaliphatic group, and $n$ is a number greater than 1 (not necessarily an integer since these epoxides are often mixtures of compounds), preferably between 1 and 5 most preferably between 1 and 3, the moles of HA should be equal to or less than the effective amount of nucleophilic catalyst remaining in the acrylate resin. This amount of stabilizer is generally equal to the amount of nucleophilic catalyst added except in the case of $\phi_3 P$ which may be partially oxidized by hydroperoxides occuring in epoxides having the formula I and II. It is generally observed that the products derived from esterification of I and II are very reactive to the HA and an excess of this acid will cause instability rather than stability and the resin will prematurely gel or become highly viscous.

In the case where the formula for the liquid epoxide used to make the acrylate resin is:

III. 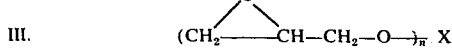

where X is an aromatic group and $n$ is a number greater than 1 (not necessarily an integer since these epoxides are often mixtures of compounds), preferably between 1 and 2, the concentration of the stabilizing acid (HA) must at least be equal to that of the effective nucleophilic catalyst. However, with the epoxides of formula III, the concentration of HA can exceed that amount without any appreciable effect. Generally the molar concentration of HA must be at least equal to the concentration of the moles of nucleophilic catalyst used to make the acrylate resin. Preferably the mole concentration can range from about 1 to about 3 times the concentration of the nucleophilic catalyst and most preferably between about 1.5 to about 2 times the nucleophilic catalyst added to make the acrylate resin.

While the addition of the stabilizing acid retards the major cause of viscosity increase it is well known that the acrylate resin can still undergo free-radical polymerization. Conventional free-radical inhibitors have been added to acrylate resins and these inhibitors can be added to the composition of this invention to further retard viscosity increases. Typical free-radical inhibitors and scavengers are phenothiozine, monomethyl ether of hydroquinone and dilauryl thiodipropionate. In addition other materials such as fillers, pigments and dyes, and the like can also be added.

In 3 days at 60°C an acrylate resin (85% ester) without additional free radical inhibitor or stabilizing acids had increased its viscosity by 11,000 centipoise. If additional free-radical inhibitor was added the resin had increased its viscosity by 10,000 centipoise under the same conditions (gel in 5 days). However, if a stabilizing acid was added instead of the free radical inhibitor the resin had an increase in viscosity of only 200 centipoise under the same conditions. If both stabilizing acid and a free radical inhibitor were added the increase in viscosity was about 200 centipoise (cps) under the same condition.

Method of Preparing Viscosity Stabilized Acrylate Resins

The viscosity stabilized acrylate resins are simply prepared by blending the required amount of stabilizing acid into the preformed acrylate resin.

While this is the simplest method of preparation, it has been discovered that because of the complex set of equilibrium and reaction rates the viscosity stabilized acrylate resins are better prepared by blending the epoxide, the acrylic type acid, the nucleophilic catalyst and at least an amount of stabilizing acid equivalent, or greater as defined above, to the moles of nucleophilic catalyst used into a stirred reactor and heating the mixture to a temperature in the range of about 180° to about 300° preferably about 200° to about 280°F, most preferably about 220° to about 260°F for a time in the range of about 0.5 hr. to about 6 hr., preferably about 0.5 hr. to about 4 hr. and most preferably about 1 hr. to about 2.5 hr.

This latter process for preparing the viscosity stabilized acrylate resin has the advantage that all the ingredients can be added initially and the added advantage that it serves to keep the polymerization at a minimum during acrylate forming reaction and immediately following completion thereby giving a lower and more repeatable final viscosity. Without the addition of stabilizing acid at the beginning of the acrylate formation, it requires very careful attention by the operator and even then, the viscosity of the finished product will vary markedly.

This process and the viscosity stabilized composition it produces allows the acrylate resin manufacturer to offer acrylate resins with a predetermined narrow variation of viscosity which retain the viscosity for much longer periods than conventional acrylate resins yet still have the necessary curing characteristics.

The following embodiments are given to further describe and illustrate the improved composition and process. The specific ingredients, properties, and reaction conditions cited in the following embodiments are not to be construed as limitations to the scope of the invention but are merely particular embodiments thereof.

ILLUSTRATIVE EMBODIMENT 1

The acrylate resins are prepared by blending the liquid epoxide, acrylic type acid and the nucleophilic catalyst in a stirred reactor and heating the mixture at 240°F for 1 to 3 hrs. in the presence of a free radical inhibitor or peroxide scavenger and a continuous air/nitrogen sparge (approximately 7% $O_2$).

| Equivalents Epoxy resin | Moles acrylate type acid | Approximate percent ester formed |
|---|---|---|
| 1 EPON 828 Resin | 1 acrylic acid | 100[4] |
| 1 EPON 828 Resin | 0.85 acrylic acid | 85 |
| 1 EPON 828 Resin | 0.5 acrylic acid | 50 |
| 1 EPON 828 Resin | 1.0 methacrylic acid | 100[4] |
| 1 EPON 871[1] Resin | 1.0 acrylic acid | 100[4] |
| 1 EPON 812[2] Resin | 1.0 acrylic acid | 100[4] |
| 1 Epoxide 8[3] | 1.0 acrylic acid | 100[4] |

[1] 871 = diglycidyl ester of dimer acid
[2] 812 = di & triglycidyl ethers of glycerine; functionality of 2.3
[3] 8 = monoglycidyl ether of $C_{14}$ alcohol - reactive diluent
[4] Approximately 100% but having at least 0.01 eg/100 g of residual epoxide and ≤ 0.01 acrylic type acid. Typical "100 percent esters" contain .01 to .02 eg/100 g equivalents of residual epoxide.

ILLUSTRATIVE EMBODIMENT 2

This embodiment illustrates the dramatic increase in viscosity stability achieved by this invention. The acrylate resin was made using EPON 828, acrylic acid and TMAC as in Illustrative Embodiment I (85% ester). The test of stability is an accelerated test in which 50 grams of the resin composition to be tested are placed in a 100 cc amber polyethylene bottle and held at 60°C in the dark for the indicated period of time. The viscosity in centipoise (cps) of the resin composition is measured initially and at the indicated period of time. The stabilizing acid used was para-toluene-sulfonic acid (PTSA) and was stirred into the preformed acrylate resin.

TABLE I

| No. | Stabilizing Acid (ratio acid to nucleo. cat.) | Additional Free radical Inhibitor (Wt.%) | Viscosity(cps/60°C) Initially | 7 d. at 60°C | 16 d. at 60°C | 30 d. at 60°C |
|---|---|---|---|---|---|---|
| 1 | 1:1 | 0 | 3200 | 4850 | 14000 | 154000 |
| 2 | 2:1 | 0 | 3200 | 3400 | 3500 | 3500 |
| 3 | 0[a] | Phenathiazine (.04) | 3300 | 13000(3 d.) | gel(5 d.) | |
| 4 | 1.67:1 | Phenathiazine (.04) | 3100 | 3500 | 3500 | ~3800 |

[a]No PTSA added

ILLUSTRATIVE EMBODIMENT 3

The following table shows the effect of $pK_a$ and nucleophilicity (n) of the anion of certain acids. It illustrates the need to have stabilizing acid with $pK_a$ of less than about 2.5 and anions with a nucleophilicity of less than about 2.5 in order to obtain effective stabilization.

The acrylate resin used was an 85% acrylic acid ester of EPON 828 Resin made with TMAC to which the acids were added at a mole raio equal to or greater than 1.67:1 stabilizing acid:TMAC.

ILLUSTRATIVE EMBODIMENT 6

A stabilized acrylate resin composition is prepared by blending the required amount of PTSA into an acrylate resin made from methacrylic acid and the liquid polyepoxide made from Bisphenol-F and epichlorohydrin. The stabilizing acid containing composition shows improved viscosity stability when compared to the composition without the acid.

TABLE II
(85% Ester)

| %W. | Acid | $pK_a$ | n | Initially | Viscosity cps η (days/60°C) 3 ± 1 | 30[c] |
|---|---|---|---|---|---|---|
| — | None | — | — | 3300 | gel | — |
| 1.0 | Salicylic Acid | 2.97 | ≥ 2.7 | 2700 | 74400 | gel(7) |
| 0.64 | Phosphoric Acid | 2.12 | Not known[a] | 2900 | 3200 | 3800 |
| 1.0 | Maleic Acid | 1.83 | 2.7 | 3200 | 5700 | gel(11) |
| 1.0 | Hypophosphorous | 1.10 | Not known[a] | 2100 | 7300 | 13000(16) |
| 1.2 | p-Toluene-Sulfonic.H$_2$O | 0.87(Calcd.) | <1 | 3200 | 3400 | 3800 |
| 1.0 | p-Phenolsulfonic | ≤ 1(est.) | ~1(est.) | 2700 | 3000 | ~3300 |
| 1.0 | Trichloroacetic | 0.70 | ≤ 2.7 | 3400 | 5300 | gel(6) |
| 1.0 | Trifluoroacetic | <0.70 | ≤ 2.7 | 2900 | 4900 | 8100(11) |
| 0.6 | Sulfuric acid | (Not measurable) | 2.5[b] | 4100 | 4200 | 4900 |

[a]HPO$_3^{\ominus}$ has n = 3.8; H$_2$PO$_3^{\ominus}$ unknown; H$_2$PO$_4^{\ominus}$ unknown
[b]SO$_4^{\ominus}$ is 2.5; HSO$_4^{\ominus}$ unknown
[c]( ) – no. of days if diff. from 30

ILLUSTRATIVE EMBODIMENT 4

The following table illustrates the effect of the nucleophilic catalyst: stabilizing acid ratio. The stabilized resin composition was made by blending PTSA with an 85% acrylate ester of EPON 828 Resin made with TMAC as in Illustrative Embodiment 2.

ILLUSTRATIVE EMBODIMENT 7

A stabilized acrylate resin composition is prepared by blending the required amount of phosphoric acid into an acrylate resin made by condensing acrylic acid with a liquid polyepoxide made from diphenylolethane and epichlorohydrin in the presence of triphenylphosphine. The reaction mixture is filtered and the clear resin containing the phosphoric acid shows improved viscos-

TABLE III

| %W.PTSA | No. | Molar Ratio PTSA:TMAC | Initial | η(cps/60°) Viscosity (Storage/60°C) 30 days | 100 days |
|---|---|---|---|---|---|
| 0 | 1 | 0 | 3300 | Gel (5 days) | |
| 0.6 | 2 | 1:1 | 3200 | 154,000 | Gel |
| 1.0 | 3 | 1.67:1 | 2600 | 3600 | 4100 |
| 1.2 | 4 | 2.0:1 | 3200 | 3500 | 4000 |
| 2.0 | 5 | 3.3:1 | 2500 | 3600 | 4300 |

ILLUSTRATIVE EMBODIMENT 5

A stabilized acrylate resin composition is prepared from an acrylate resin made as in Illustrative Embodiment I except using TPP as the nucleophilic catalyst instead of TMAC. The stabilizing acid was blended into the preformed ester. The composition containing the stabilizing acid shows improved viscosity stability on storage when compared to the resin without the acid.

ity stability when compared to the resin without it. The turbid treated resin also shows improved viscosity stability.

ILLUSTRATIVE EMBODIMENT 8

This embodiment illustrates the improved narrow variation in viscosity and the improved stability that can be achieved when the acrylate resin compositions were made by a process in which the nucleophilic catalyst and the stabilizing acid were added simultaneously as compared to the process of forming the composition that involves merely blending the preformed acrylate resin and the acid.

The process of preparing the stabilized acrylate resins was carried out as in Illustrative Embodiment I except the PTSA was added at the same time as the TMAC. The following table compares the variation in initial viscosity obtained using the process where the acrylate ester is formed in the presence of the stabilizing acid and where it is added to the preformed acrylate ester. The table also illustrates the improved viscosity stability obtained using the stabilizing acid in both processes. All examples except number I had PTSA in them. The letter B means the compositions were made by blending the PTSA into the acrylate resin and the letter R means a composition made by the process invention of reacting the epoxide and acrylic acid in the presence of TMAC and PTSA.

TABLE IV

| No. | Type of Ester | Process of Preparation | Epoxide Eqv.100/g. | Viscosity ($\eta$= poise/77° F)[1] | | |
|---|---|---|---|---|---|---|
| | | | | Initial | Storage at 60°C 30 days | 90 days |
| 1 | 100% | NO PTSA | .026 | 8080(79°) | — | 20000 |
| 2 | 100% | B | .017 | 6100(79°) | — | 10660 |
| 3 | 100% | B | .027 | 7560(76°) | — | 11880(79°/112 d.) |
| 4 | 75% | B | .104 | 5160(75.5°) | 4380 | 4900(~77°/73 d.) |
| 5 | 75% | R | .105 | 4450 | 5340 | 3950(~77°/63 d.) |
| 6 | 75% | R | .105 | 5000 | 6230(36 d.) | 4650(~77°/66 d.) |
| 7 | 100% | R | .027 | 7500 | 9400(22 d.) | — |

[1] ~ 77 = 75° to 79° F

ILLUSTRATIVE EMBODIMENT 9

This embodiment Illustrates that the stabilized resin compositions made by the process of this invention and by blending were readily photopolymerizable under the conditions generally employed by end users.

The following table shows a comparison of the cure time of various acrylate resin compositions.

The acrylate resin used were the EPON 828 Resin/acrylates all approximately 85–95% esterified using TPP. The stabilizing acid used was PTSA at the 1 nucleophilic catalyst: 1.67 PTSA mole ratio.

TABLE V

| No. | Compositions | Degree of Cure (MEK Rubs)[a] Using 1 second Exposure, 2.4% Trig. 14[b] as the photosensitizer |
|---|---|---|
| 1 | No stabilizing(Control) | 95 |
| 2 | Stabilizing acid(PTSA) blended into ester (B) | 85, 85 |
| 3 | Stabilizing acid(PTSA) used in the process for preparing the ester | (Est. 85) |
| 4 | No. 2 + free radical inhibitor | 70 |
| 5 | Stabilizing acid (H$_3$PO$_4$) blended into ester and filtered | 95 |

[a](MEK = methyl ethyl ketone)
[b]Trig. 14 = Benzoinether

I claim as my invention:

1. A stabilized, curable acrylate resin composition having improved viscosity stability on storage and shipping which comprises a mixture of;
   A. a liquid acrylate type resin made in the presence of free radical inhibitors or peroxide scavenger by the reaction of acrylic acid, methacrylic acid or mixtures thereof with a liquid polyepoxide produced by contacting a polyphenol and epichlorohydrin, in the presence of a nucleophilic catalyst where at least 50% of the epoxide groups have reacted with said acrylic acid or methacrylic acid and the acrylate resin has greater than 0.015 equivalents of residual epoxide function per 100 grams resin,
   B. an acid having a pKa of less than about 2.5 and having an anion with a nucleophilicity at 50°C in aqueous acetone of less than about 2.5 where said acid is present in an amount of from 1 to about 2 times the moles of nucleophilic catalyst used to make the acrylate resin, and
   C. optionally, an additional inhibiting quantity of a free radical inhibitor and a peroxide scavenger.

2. The improved composition according to claim 1, where the polyphenol is Bisphenol-A.

3. The improved composition according to claim 1, where the polyphenol is Bisphenol-F.

4. The improved composition according to claim 2 where the acrylate type resin is made with acrylic acid.

5. The improved composition according to claim 4 where the nucleophilic catalyst used is triphenylphosphine.

6. The improved composition according to claim 1 where the nucleophilic catalyst used is triphenylphosphine.

7. The improved composition of claim 1 where the acid is para-toluenesulfonic acid.

8. The improved composition of claim 5 where the acid is phosphoric acid.

9. the improved composition of claim 7 where an inhibiting amount of the free radical inhibitor, phenothiazine, is added.

10. The method of preparing an improved stabilized curable liquid acrylic resin having improved viscosity stability on storage and shipping which comprises;
   I. blending the following into a stirred reactor;
      a. a liquid polyepoxide made from a polyphenol compound and epichlorohydrin,
      b. acrylic acid, methacrylic acid or mixtures thereof,
      c. a nucleophilic catalyst,
      d. an acid having a pKa of less than about 2.5 and having an anion having a nucleophilicity of less than about 2.5 at 50°C in aqueous acetone in a molar amount equal to about 1 to about 2 times the moles of c, and
      e. optionally a free radical inhibitor,
   II. heating the ingredients to a temperature in the range of about 200° to about 280°F for a period of time in the range of about 1 hour to 6 hours, then cooling to room temperature.

11. The process according to claim 10 where the polyphenol is Bisphenol-A.

12. The process according to claim 11 where b is acrylic acid.

13. The process according to claim 12 where c is triphenylphosphine.

14. The process according to claim 13 where d is para-tolunesulfonic acid.

15. In the process for preparing curable acrylate type resins made by contacting liquid polyepoxides, produced by contacting polyphenol compounds and epichlorohydrin, and acrylic acid, methacrylic acid or mixtures thereof in the presence of a nucleophilic catalyst at a temperature of from about 180° to about 300°F, a process for producing resins having improved initial resin viscosity control which comprises adding an acid simultaneously with the nucleophilic catalyst in a molar amount ranging from about 1 to about 2 times the number of moles of nucleophilic catalyst used in the reaction, said acid having a pKa of less than 2.5 and, having an anion with a nucleophilicity of less than 2.5 at 50°C in aqueous acetone.

* * * * *